United States Patent [19]

Tanaka et al.

[11] Patent Number: 5,328,772
[45] Date of Patent: Jul. 12, 1994

[54] MULTILAYER SLIDING MATERIAL FOR HIGH-SPEED ENGINE AND METHOD OF PRODUCING SAME

[75] Inventors: Tadashi Tanaka, Konan; Masaaki Sakamoto, Nagoya; Motomu Wada, Owariasahi; Koichi Yamamoto; Hideo Ishikawa, both of Komaki; Youji Nagai, Nagoya; Kenji Sakai, Ichinomiya, all of Japan

[73] Assignee: Daido Metal Company, Nagoya, Japan

[21] Appl. No.: 834,085

[22] Filed: Feb. 12, 1992

[30] Foreign Application Priority Data

Feb. 20, 1991 [JP] Japan .................. 3-026314

[51] Int. Cl.⁵ .................................. B22F 7/04
[52] U.S. Cl. ............................. 428/548; 428/553; 428/554; 428/555; 419/28; 419/43
[58] Field of Search .............. 428/547, 548, 550, 553, 428/554, 555, 557, 551, 552; 419/28, 43

[56] References Cited

U.S. PATENT DOCUMENTS

| | | | |
|---|---|---|---|
| 2,986,464 | 5/1961 | Lewis et al. | 75/208 |
| 3,403,010 | 9/1968 | MacDonald et al. | 29/183.5 |
| 3,950,141 | 4/1976 | Roemer | 29/196.12 |
| 4,002,472 | 1/1977 | Le Brasse et al. | 75/208 R |
| 4,406,857 | 9/1983 | Mahrus et al. | 420/474 |
| 4,978,587 | 12/1990 | Mori et al. | 428/645 |
| 4,999,257 | 3/1991 | Imai | 428/555 |

FOREIGN PATENT DOCUMENTS

1463464  2/1975  United Kingdom .

OTHER PUBLICATIONS

Teaching material entitled "Challenge to new bearing material needed by demand for high performance" for Lecture of Japanese Mechanical Society, pp. 47 to 52, No., 1 & 2, 1990.
Machine Design, vol. 35, No. 2, pp. 63 to 71, Feb. 1990.

*Primary Examiner*—Donald P. Walsh
*Assistant Examiner*—Chrisman D. Carroll
*Attorney, Agent, or Firm*—Browdy and Neimark

[57] ABSTRACT

A multilayer sliding material for high-speed engine, comprising a steel back metal, a Cu or Cu-base alloy plating layer, a Cu-Pb bearing alloy layer, and an overlay, said steel back metal having 155 or more of Vickers hardness and 42 kgf/mm² or more of 0.2% yield strength, a Cu-Pb bearing alloy layer containing 15–30 wt % of Pb and 0.5–2.0 wt % of Sn and having 0.25 cal/cm.s.° C. or more of thermal conductivity, 75 or more of Vickers hardness and 18 kgf/mm² or more of tensile strength, said overlay of a lead base alloy containing 2–8 wt % of Sn and 3–11 wt % of In and having more than 250° C. of melting start temperature. The material has a superior antiseizure property at high speed of engine. In particular, the rising of the melting start temperature of the metal of the overlay and the thermal conductivity of the bearing alloy provides a superior sliding property of plain bearing at high speed of engine.

10 Claims, No Drawings

MULTILAYER SLIDING MATERIAL FOR HIGH-SPEED ENGINE AND METHOD OF PRODUCING SAME

BACKGROUND OF THE INVENTION

Field of the Invention

The present invention relates to a plain bearing and particularly to a plain bearing showing sufficiently good performance under the conditions of an increase in the temperature of a lubricant oil and an increasing inertia of the bearing applied to a bearing housing both caused by an increased rotational speed of an internal-combustion engine following a recent increased power of the engine.

Description of the Related Art

A conventional multilayer sliding material for a plain bearing metal used in an internal-combustion engine, which metal has a multilayer structure of a steel back metal, a copper-lead bearing alloy layer and a lead based alloy overlay, has been widely applied to a high-speed heavy-duty internal-combustion engine. The back metal is required to meet the load resistance requirements of the bearing. The overlay is required to meet the antiseizure property, the compatibility, the foreign matter-embedding property and the corrosion resistance requirements of the bearing. The bearing alloy layer comprises a Cu (copper) and Pb (lead) based alloy, or a Cu, Sn (tin) and Pb based alloy. The overlay comprises a Pb and Sn based alloy, or a Pb, Sn and Sb (antimony) based alloy, or a Pb, Sn and Cu based alloy, or Pb, Sn and In (indium) based alloy. A plating of Ni (nickel) or the like is often sandwiched between the overlay and the bearing alloy layer in order to prevent Sn etc. from diffusing out of the overlay into the bearing alloy layer during operation of the engine. The surface of the plain bearing may have a 10 $\mu$m or less thick plating layer of Sn or the like for anticorrosion.

Recently, there has been a tendency of increasing the rotational speed of automotive internal-combustion engine as a part of means for enhancing the performance of internal-combustion engines, especially automotive internal-combustion engines. This results in an increase in the temperature of the lubricant oil and as a result there occurs such problems as a wiping of and severe abrasion of the overlay in the case of a conventional multilayer sliding material comprising a lead base alloy overlay, a copper-and-lead bearing alloy, and a steel back metal, under conditions of high speed and high temperature of the automotive internal-combustion engine. Therefore, a sliding material of an enhanced antiseizure property and an enhanced abrasion resistance under the conditions of high speed and high temperature has been required.

In addition, the high-speed rotation of the engine is apt to deform the bearing housing by inertia of the engine. This deformation causes a fretting corrosion in the back surface of the bearing. In order to prevent the fretting corrosion, the steel back metal of the bearing is required to be stiff and tough, or an interference of the back metal relative to the bearing housing is made large to increase the degree of adhesion therebetween while keeping increased tightness to endure stress occurring when the bearing is fitted into the bearing housing.

The temperature environment of the bearing has become more severe because of an increase in the temperature of the lubricant oil caused by the increased rotational speed of the engine. Therefore, the overlay has been required to have superior heat resistance and to have such components so that hardly any reaction layer occurs at the boundary between the overlay and an underlying layer, which reaction layer causes the wiping of the overlay. Further, a bearing alloy is desired to have a high thermal conductivity sufficient to quickly dissipate heat from the bearing.

SUMMARY OF THE INVENTION

The present invention was made especially to improve the antiseizure property of a plain bearing by making physical properties of each layer of a multilayer sliding material adaptable to a high-speed internal-combustion engine. An object of the present invention is to provide a multilayer sliding material for high speed engines having a high antiseizure property at high speeds at high temperatures, and a method of producing same, while keeping essentially the same withstand load and fatigue resistance for plain bearings as a conventional multilayer sliding material.

In the invention, the combination of chemical compositions and selected physical properties of the layers of a high-speed multilayer sliding material for a plain bearing in service in internal-combustion engine has achieved the object of the present invention.

A multilayer sliding material for high-speed engine of the present invention comprises a four-layer structure having a steel back metal, a plating layer of copper or copper base alloy bonded to the steel back metal, a Cu-Pb bearing alloy layer bonded to the plating layer, and a lead base alloy overlay bonded to the bearing alloy layer, the back metal having 155 or more of Vickers hardness and 42 kgf/mm$^2$ or more of 0.2% yield strength, the Cu-Pb bearing alloy having 0.25 cal/cm.s.°C. or more of thermal conductivity, 75 or more of Vickers hardness and 18 kgf/mm$^2$ or more of tensile strength, and the lead base alloy overlay including 2–8 wt % of Sn and 3–11 wt % of In and having a melting start temperature of more than 250° C.

A method of producing a multilayer sliding material for high-speed engine according to the present invention comprises the step of repeating both the sintering and rolling of a copper-lead-tin bearing alloy powder spread over the back metal having a plating layer of copper or copper base alloy bonded to the back metal to thereby produce a bimetal, the sintering and rolling being conducted so that the total reduction ratio of the repeated rollings is 7–35% with respect to the initial thickness of the back metal. Finally, the back metal has 155 or more of Vicker's hardness and 42 kgf/mm$^2$ or more of 0.2 yield strength and the bearing alloy has 75 or more of Vicker's hardness and 18 kgf/mm$^2$ or more of tensile strength.

DETAILED DESCRIPTION OF THE INVENTION

The back metal is as stiff as 155 or more of Vickers hardness and as tough as 42 kgf/mm$^2$ or more of 0.2% yield strength to enable a large interference when the bearing is fitted into the bearing housing, in order to prevent fretting corrosion from occurring on the back surface of the back metal when the bearing housing is deformed by inertia and to enhance the tightness (adhesion) of the fitting of the bearing and the bearing housing.

The bearing alloy layer has 0.25 cal/cm.s.° C. of thermal conductivity in order to quickly transfer heat occurring in the sliding surface of the bearing through the bearing alloy layer and the back metal to the bearing housing for heat dissipation and thereby to enhance the antiseizure property of the bearing. The bearing alloy layer also has 75 or more of Vickers hardness and 18 kgf/mm$^2$ or more of tensile strength in order to essentially make the abrasion resistance thereof substantially equal to that of a prior-art bearing. Furthermore, the bearing alloy of the bearing alloy layer limits the content of Sn, which reduces the thermal conductivity of the bearing alloy, to 0.5-2.0 wt % in order to increase the thermal conductivity thereof.

The lead base alloy of the overlay is required to have a high rising melting start temperature in order to prevent a wiping in the overlay at high temperature. Generally, contents of Sn and In in the lead base alloy must be reduced in order to raise the melting start temperature of the lead base alloy. However, the content of Sn is selected to be 2-8 wt % and the content of In is selected to be 3-11 wt % in view of a correlation of abrasion resistance and anticorrosion, so that the melting start temperature exceeds 250° C. Because the overlay does not cause a thick reaction layer at the boundary defined between the overlay and the underlying layer, which reaction layer is apt to occur due to the thermal diffusion of Sn and In at high temperature, it is possible to prevent the wiping from occurring in the overlay.

The multilayer sliding material of the four layers possesses a superior antiseizure property and has essentially the same abrasion resistance and fatigue resistance as a conventional multilayer sliding material for plain bearings, thereby providing a superior bearing material for high-speed internal-combustion engine.

The multilayer sliding material of the present invention has a 1 to 10 μm thick plating of copper or a copper base alloy at the boundary between the back metal and the bearing alloy layer, which plating increases the adhesive strength of the back metal and the bearing alloy layer.

The multilayer sliding material of the present invention has also a 5 μm or less thick plating of Ni, Co (cobalt), Ag (silver) or its alloy at the boundary between the bearing alloy layer and the overlay which plating prevents the Sn and In in the overlay from diffusing into the bearing alloy layer to thereby maintain the abrasion resistance and the anti-corrosion properties of the overlay. The surfaces of the overlay and the back metal may have 3 μm or less thick platings of Sn, Pb or its alloy formed thereon for preventing corrosion.

A method of producing a multilayer sliding material for high-speed engine according to the present invention comprises the step of repeating both the sintering and rolling of powder of a Cu-Pb-Sn bearing alloy spread over a back metal provided with the plating layer of Cu or Cu base alloy to thereby produce a bimetal, the sintering and rolling being conducted so that the total reduction ratio of the repeated rollings is 7-35% of the initial thickness of the back metal. Finally, the back metal has 155 or more of Vickers hardness and 42 kgf/mm$^2$ or more of 0.2% yield strength and the Cu-Pb-Sn bearing alloy layer has 75 or more of Vickers hardness and 18 kgf/mm$^2$ or more of tensile strength.

Reasons for limiting elements of the multilayer sliding material for high-speed engine and the method of producing same of the present invention will be shown hereinafter.

1. Steel Back Metal i) Hardness: 155 or more of Vickers hardness

If the Vickers hardness of the back metal is less than 155, there will occur a slight deformation in the bearing housing during high-speed rotation of the engine, with the result that fretting corrosion is caused on the rear surface of the back metal.

ii) 0.2% yield strength: 42 kgf/mm$^2$ or more

If the 0.2% yield strength of the back metal is less than 42 kgf/mm$^2$, a large interference provided when the bearing is fitted into the bearing housing will cause a yield of the bearing so that the tightness (adhesion) of the fitting of the bearing and the bearing housing decreases during operation of the engine.

2. Copper and Lead Alloy of Bearing alloy Layer i) Thermal conductivity: 0.25 cal/cm.s.° C.

If the thermal conductivity of the Cu-Pb bearing alloy layer is less than 0.25 cal/cm.s.° C., the bearing alloy layer will be insufficient to quickly transfer heat from the sliding surface of the bearing to the back metal and furthermore to the bearing housing and to thereby dissipate heat, so that the antiseizure property of the bearing will become poor.

ii) Hardness: 75 or more of Vickers hardness

If the Vickers hardness of the Cu-Pb bearing alloy layer is less than 75, the Cu-Pb bearing alloy layer will have an insufficient strength and therefore the resultant bearing will have a poor fatigue resistance.

iii) Tensile strength: 18 kgf/mm$^2$ or more

If the tensile strength of the Cu-Pb bearing alloy layer is less than 18 kgf/mm2, the Cu-Pb bearing alloy layer will have an insufficient strength, resulting in a poor fatigue resistance.

iv) Pb content of 15-30 wt %

If the content of Pb is less than 15 wt %, the Cu-Pb bearing alloy layer will have a poor antiseizure property and a poor foreign matter embedding capability. On the other hand, if it exceeds 30 wt %, the Cu-Pb bearing alloy layer will have poor strength and a poor fatigue resistance.

v) Sn content of 0.5-2.0 wt %

When the content of Sn is less than 0.5 wt %, the Cu-Pb bearing alloy layer will have a poor strength and a poor anticorrosion resistance. On the other hand, if it exceeds 2.0 wt %, the Cu-Pb bearing alloy layer will have a poor thermal conductivity and therefore a poor antiseizure property.

3. Lead Base Alloy Overlay i) Sn content of 2-8 wt %

If the content of Sn is less than 2 wt %, the overlay will have a poor strength and a poor abrasion resistance. On the other hand, if it exceeds 8 wt %, the melting start temperature of the overlay will become too low because taking into account the relationship between Sn and In, greater quantities of Sn would cause undesirably high diffusion into the boundary between the underlying layer and the overlay, with the result that a reactive layer would be apt to occur to cause the wiping in the overlay, which would result in a poor antiseizure property of the bearing.

ii) In content of 3-11 wt %

If the content of In is less than 3 wt %, the corrosion resistance of the overlay, which resistance is brought about by the coexistence of In and Sn will be poor. On the other hand, if it exceeds 11 wt %, the melting start temperature of the overlay will become too low because, taking into account the correlation of Sn and In, greater quantities of In would cause the overlay constituents to violently diffuse into the boundary between the underlying layer and the overlay, so that a reactive layer would be apt to occur to cause the wiping in the overlay, which in turn would result in the poor antiseizure property of the bearing.

4. Plating of Copper or Copper Base Alloy at Boundary between Back Metal and Bearing Alloy layer Thickness: 1 to 10 $\mu$m This plating is provided between the back metal and the bearing alloy layer in order to assure under an increased rotational speed condition a stable adhesive (bonding) strength of the back metal and the bearing alloy layer and to improve fatigue strength. A thickness more than 10 $\mu$m thickness of the plating makes the production cost high without any merit, while a thickness less than 1 $\mu$m does not bring about the improvement in this adhesive strength. Thus, the thickness of this plating is up to 10 $\mu$m.

5. Plating of Ni, Co, Ag or its Alloy at Boundary between Bearing Alloy Layer and Overlay Thickness: 5 $\mu$m or less Since this plating is provided in order to prevent Sn and In in the overlay from diffusing into the Cu-Pb bearing alloy layer, a thickness of this plating up to 5 $\mu$m is sufficient.

6. Plating layer of Sn, Pb or its Alloy on Surfaces of Overlay and Back Metal Thickness: 3 $\mu$m or less Each plating layer is provided for anticorrosion. Thus, an appropriate thickness of the plating layer is up to 3 $\mu$m. If the thickness is more than 3 $\mu$m, the plating layer will deteriorate the surface property of the overlay.

7. Total Reduction Ratio of Repeated Rolling of Back Metal of 7-35%

A total reduction ratio less than 7% cannot bring about sufficient mechanical strength with respect to the back metal and the bearing alloy layer, so that superior fatigue resistance and large interference of the bearing both required for high-speed internal-combustion engine cannot be obtained. On the other hand, a total reduction ratio more than 35% increases the repetition times of rolling and incurs an increased cost without significant increase in the mechanical strength of the back metal.

DETAILED DESCRIPTION OF THE PREFERRED EMBODIMENTS

Preferred embodiment of the present invention will be described hereinafter.

Powders of Cu-Pb-Sn alloys having chemical compositions shown in Table 1 were spread over steel strips each having a surface plating of copper. Each of them was then sintered in a reducing furnace at 700°-900° C. for 10-30 min to provide a sintered composite. It was rolled by a rolling mill and was then sintered again.

Rolling was again effected to provide a sintered bimetal. Of course, rollings of the rolled sintered material may be repeated the number of necessary times as occasion demands so that the total reduction rate due to rolling becomes 7-35%. For comparison, a sintered bimetal was produced by using a steel strip having no surface plating of copper through the same production conditions.

Table 1 shows chemical compositions, hardnesses, the tensile strength and thermal conductivities with respect to bearing alloy layer of bimetals; hardnesses and 0.2% yield strengths regarding steel back metal; adhesive strengths between the bearing alloy layer and the back metal; the presence and the thickness of a plating of copper at the boundary between the bearing alloy layer and the back metal; and reduction rates of rolling.

Subsequently, the bimetal was formed by pressing and machining to have a shape of a semicircular cross section. Then, it was degreased and acid pickled in the same manner as in a normal electroplating, and the surface thereof was subsequently covered with a 1-2 $\mu$m thick plating of Ni. This nickel plating was conducted in a usual watt bath. The surface of each nickel plated bearing was then covered with a lead and tin alloy in the well-known boron fluoride bath. Further, the surface was covered with a plating of indium in a sulfamic acid bath and then was covered with a 1-2 $\mu$m plating of tin. Subsequently, each tin plated bearing was heat-treated at 140° C. for 2 hr in order to alloy the indium plating. Table 2 shows chemical compositions and melting start temperature of the lead base alloy overlay.

Table 3 shows various combinations of the layers of multilayer sliding materials thus produced. An antiseizure test at high speed of the engine of the multilayer sliding materials was conducted by using a high-speed seizure tester having 25 m/s of shaft peripheral speed and 9000 rpm of revolutions under a static load. Table 4 shows detailed conditions for this high-speed seizure test. After 1 hr running-in, the oiling rate of a lubricant oil was selected 150 ml/min and the static load was cumulatively increased. A case where the temperature of the back surface of the bearing exceeds 200° C. or a drive current fed to an electrical motor driving the tester indicates an abnormal value was determined to be a seizure of the bearing. Table 3 shows bearing stress measured immediately before seizure (i.e., maximum bearings stress in nonseizure).

Heights of bearings regarding combinations A, J and K in Table 3 were measured in order to confirm variation in the heights of the bearings before and after the fitting (mounting) thereof into the bearing housing in such a manner that, after a 1 hr running-in of the fitted bearing, the fitted bearing was operated at a bearing stress of 300 kgf/cm$^2$ at 9000 rpm for 20 hr. Table 5 shows the changes in the heights of the bearings.

In addition, there were effected corrosion resistance tests of a bearing with an overlay of a No. 1 alloy of Table 2 which bearing included a plating of Ni in the interface between the Cu-Pb bearing alloy layer and the overlay and of another bearing with the overlay of the No. 1 alloy which bearing having no Ni plating for comparison in such a manner that both the bearings were immersed in an SAE 10 engine oil including no inhibitor but 1% oleic acid as an etching agent at 130° C. for 100 hr and the resulting corrosion losses were measured. Table 6 shows the corrosion losses.

TABLE 1

| | Bearing Alloy layer | | | | | Back Metal | | Adhesive Strength between Bearing Alloy layer and Back Metal (kgf/mm²) | Cu Plating Thickness (μm) | Total Reduction Rate of Rolling (%) | Kind |
|---|---|---|---|---|---|---|---|---|---|---|---|
| No. | Chemical composition (wt %) | | Hardness Hv(5) | Tensile Strength (kgf/mm2) | Thermal Conductivity (cal/cm·se·°C.) | Hardness Hv(5) | 0.2% Yield Strength (kgf/mm²) | | | | |
| | Sn | Pb | Cu | | | | | | | | |
| 1 | 1.5 | 23 | balance | 80 | 23 | 0.29 | 170 | 48 | 13 | 8 | 15 | invention |
| 2 | 0.6 | 29 | balance | 63 | 19 | 0.31 | 170 | 48 | 12 | 8 | 15 | invention |
| 3 | 1.9 | 17 | balance | 88 | 25 | 0.26 | 170 | 48 | 14 | 8 | 15 | invention |
| 4 | 0.3 | 33 | balance | 55 | 14 | 0.34 | 170 | 48 | 10 | 8 | 15 | comparison |
| 5 | 2.5 | 13 | balance | 96 | 27 | 0.21 | 170 | 48 | 15 | 8 | 15 | " |
| 6 | 1.5 | 23 | balance | 70 | 16 | 0.29 | 151 | 40 | 11 | 8 | 4 | " |
| 7 | 1.5 | 23 | balance | 83 | 24 | 0.29 | 196 | 58 | 13 | 8 | 37 | " |
| 8 | 1.5 | 23 | balance | 80 | 23 | 0.29 | 170 | 48 | 6 | none | 15 | " |

TABLE 2

| No. | Chemical Composition (wt %) | | | Melting Start Temperature (°C.) | Kind |
|---|---|---|---|---|---|
| | Sn | In | Pb | | |
| 1 | 5 | 7 | balance | 275 | invention |
| 2 | 2 | 3 | balance | 295 | invention |
| 3 | 8 | 11 | balance | 250 | invention |
| 4 | 1 | 2 | balance | 305 | comparison |
| 5 | 9 | 12 | balance | 235 | comparison |

TABLE 3

| Combination | A | B | C | D | E | F | G | H | I | J | K |
|---|---|---|---|---|---|---|---|---|---|---|---|
| Pb-Base Alloy Overlay | 1 | 2 | 3 | 4 | 5 | 1 | 1 | 1 | 1 | 1 | 1 |
| Cu—Pb Bearing Alloy Layer | 1 | 1 | 1 | 1 | 1 | 2 | 3 | 4 | 5 | 6 | 7 |
| Max Bearing Stress in Nonseizure (kgf/cm²) | 700 | 650 | 600 | 450 | 400 | 650 | 650 | 550 | 450 | 650 | 650 |

TABLE 4

| Item | Condition | Unit |
|---|---|---|
| Shaft Diameter | 53 | mm |
| Bearing Width | 16 | mm |
| Revolutions | 9000 | rpm |
| Velocity | 25 | m/s |
| Lubricant Oil | machine oil 22 | — |
| Temperature at Oil Inlet | 100–110 | °C. |
| Oil Supply Rate | 150 | cc/min |
| Material for Shaft | S45C (JIS) | — |
| Shaft Roughness | 0.4–0.6 | Rmax μm |

TABLE 5

| Combination | Height Difference (μm) | Kind |
|---|---|---|
| A | 5 | invention |
| J | 20 | Comparison |
| K | 4 | Comparison |

TABLE 6

| No. | Ni Plating | Weight Loss (mg/cm²) | Kind |
|---|---|---|---|
| 1 | present | 3 | invention |
| 2 | none | 15 | comparison |

As described above, the multilayer sliding materials of the present invention are superior to the comparison materials in various points required for a sliding material for high-speed internal-combustion engine. Each of the Cu-Pb alloys is well balanced at high speed and at high temperature which has the high levels of mechanical strengths such as hardness and tensile strength while having essentially the same level of thermal conductivity as the comparison materials. The high total reduction ratio of rolling of the present invention serves to provide the high levels of the mechanical strengths of the bearing alloy layer and the back metal, increase the fatigue resistance of the bearing and makes the large interference of the bearing possible for increasing the tightness (adhesion) of the fitting of the bearing and the bearing housing. It can be concluded that the Cu plating in the boundary (interface) between the back metal and the bearing alloy layer contributes to the enhancement of the adhesive strength of the back metal and the bearing alloy layer. The difference in the heights of the bearing of the invention multilayer sliding material before and after the fitting of the bearing into the bearing housing was about ¼ of those of the comparison material, so that this result serves to assure the large interference of the bearing adaptable to the increase of engine speed. The lead base alloy overlay according to the present invention has the superior high-speed antiseizure resistance While having essentially the same melting start temperature as the comparison materials. It can be concluded that the provision of the Ni plating in the interface between the bearing alloy layer and the overlay reduces the corrosion loss of the overlay of the present invention to about 1/5 of that of the overlay of a comparison material and contributes to the improvement of the corrosion resistance of the multilayer sliding material. The multilayer sliding materials of the combinations of the layers of the overlay, the bearing alloy layer and the back metal according to the present invention show the high stable levels of antiseizure property in the high-speed seizure test. Thus, the advantages of the present can be definitely understood. Thus, the multi-layer sliding materials of the present invention brought about from the improvements in the chemical composition and the physical properties of and from the method of producing the back metal, the bearing alloy layer and the overlay have the high level of antiseizure property in the situations of the increased temperature of the lubricant oil and the increased inertia of the engine exerted on the bearing housing.

What is claimed is:

1. A multilayer sliding material for a high-speed rotation shaft, comprising a four-layer structure having a steel back metal, a plating layer of copper or copper base alloy bonded to the steel back metal, a Cu-Pb bearing alloy layer bonded to the plating layer, and an overlay of a lead base alloy bonded to the bearing alloy layer, the steel back metal having not less than 155 of Vickers hardness and not less than 42 kgf/mm$^2$ of 0.2% yield strength, the Cu-Pb bearing alloy layer having not less than 0.25 cal/cm.s.°C. of thermal conductivity, not less than 75 of Vickers hardness and not less than 18 kgf/mm$^2$ of tensile strength, the lead base alloy consisting of 2-8 wt % of Sn and 3-11 wt % of In and the balance Pb and incidental impurities and having more than 250° C. of melting start temperature.

2. The multilayer sliding material for a high-speed rotation shaft as recited in claim 1, wherein the Cu-Pb bearing alloy layer consists of 15-30 wt % of lead and 0.5-2.0 wt % of tin, and the balance copper and incidental impurities.

3. The multilayer sliding material for a high-speed rotation shaft as recited in claim 1, said plating layer of copper of a copper base alloy a provided between the back metal and the bearing alloy layer has a thickness of 1 to 10 μm.

4. The multilayer sliding material for a high-speed rotation shaft as recited in claim 1, further including a not more than 5 μm thick plating layer of nickel, cobalt, silver or its alloy at the boundary between the bearing alloy layer and the overlay.

5. The multilayer sliding material for a high-speed rotation shaft as recited in claim 1, further including a not more than 3 μm thick plating layer of tin, lead or its alloy on the surface of each of the overlay and the back metal.

6. A method of producing a multilayer sliding material for a high-speed rotation shaft, comprising the step of sintering and rolling of a copper-lead-tin bearing alloy powder spread over the steel back metal having a plating layer of copper or copper base alloy bonded to the back metal to thereby produce a bimetal, the sintering and rolling being repeated so that a total reduction ratio of the repeated rolling is 7-35% with respect to the initial thickness of the steel back metal measured at a start of the sintering and rolling, the steel back metal of a final product having at least 155 of Vickers hardness and at least 42 kgf/mm$^2$ of 0.2% yield strength, the Cu-Pb bearing alloy of the final product having at least 75 of Vickers hardness and at least 18 kgf/mm$^2$ of tensile strength.

7. A high-speed rotation shaft capable of rotating at 9,000 rpm without seizure, said shaft comprising a multi-layer sliding material comprising:

a steel back metal having a Vickers hardness of at least 155 and a 0.2% yield strength of at least 42 kgf/mm$^2$;

a plating layer of 1-10 μm thickness of copper or copper based alloy bonded to said steel back metal;

a Cu-Pb bearing alloy layer bonded to said copper or copper base plating layer, said Cu-Pb bearing alloy layer consisting essentially of 15-30 weight % of lead and 0.5-2.0 weight % of tin, and the balance being copper and incidental impurities, said Cu-Pb bearing alloy layer having a thermal conductivity of at least 0.25 cal/cm.s.°C., a Vickers hardness of at least 75 and a tensile strength of at least 18 kgf/mm$^2$;

a boundary plating layer having a thickness not greater than 5 μm over said bearing alloy layer and formed of nickel, cobalt, silver or its alloy, and an overlay of a lead base alloy over said boundary plating layer, said lead base overlay consisting essentially of 2-8 weight % of Sn and 3-11 weight % of In and the balance Pb and incidental impurities, and having a melting start temperature of greater than 250° C.

8. A high speed rotation shaft in accordance with claim 7 wherein said multi-layer sliding material further includes a plating layer of tin, lead or its alloy on the surface of at least one of said overlay and said back metal.

9. A high speed rotation shaft in accordance with claim 7 wherein said multi-layer sliding material further includes a plating layer of tin, lead or its alloy on the surface of each of the overlay and said back metal.

10. A high speed rotation shaft according to claim 7, wherein said boundary plating layer is Ni.

* * * * *